US012786840B2

(12) United States Patent
Malkamäki et al.

(10) Patent No.: US 12,786,840 B2
(45) Date of Patent: Nov. 3, 2026

(54) ENHANCEMENT ON INTEGRATED ACCESS AND BACKHAUL NETWORK

(71) Applicant: Nokia Technologies Oy, Espoo (FI)

(72) Inventors: Esa Mikael Malkamäki, Espoo (FI); Matti Einari Laitila, Oulu (FI); Xiang Xu, Beijing (CN); Esa Markus Metsälä, Espoo (FI)

(73) Assignee: Nokia Technologies Oy, Espoo (FI)

( * ) Notice: Subject to any disclaimer, the term of this patent is extended or adjusted under 35 U.S.C. 154(b) by 332 days.

(21) Appl. No.: 18/294,378

(22) PCT Filed: Aug. 17, 2021

(86) PCT No.: PCT/CN2021/112888

§ 371 (c)(1),
(2) Date: Feb. 1, 2024

(87) PCT Pub. No.: WO2023/019413

PCT Pub. Date: Feb. 23, 2023

(65) Prior Publication Data

US 2024/0349161 A1 Oct. 17, 2024

(51) Int. Cl.
*H04W 40/12* (2009.01)
*H04L 45/24* (2022.01)
*H04W 28/06* (2009.01)

(52) U.S. Cl.
CPC ............. *H04W 40/12* (2013.01); *H04L 45/24* (2013.01); *H04W 28/06* (2013.01)

(58) Field of Classification Search
CPC ... H04L 1/08; H04L 2001/0097; H04L 45/24; H04B 7/155; H04W 28/02; H04W 28/06; H04W 40/02; H04W 40/12
(Continued)

(56) References Cited

U.S. PATENT DOCUMENTS

2023/0199613 A1* 6/2023 Jung ..................... H04W 40/02
370/329
2023/0403067 A1* 12/2023 Visa ........................ H04L 45/24
(Continued)

FOREIGN PATENT DOCUMENTS

WO 2021/006691 A1 1/2021
WO 2022/056932 A1 3/2022

OTHER PUBLICATIONS

"3rd Generation Partnership Project; Technical Specification Group Radio Access Network; NG-RAN; F1 general aspects and principles (Release 16)", 3GPP TS 38.470. V16.4.0, Apr. 2021, pp. 1-17.
(Continued)

*Primary Examiner* — Robert J Lopata
(74) *Attorney, Agent, or Firm* — Lippes Mathias LLP

(57) ABSTRACT

Example embodiments of the present disclosure relate to devices, methods, apparatuses and computer readable storage media for enhancement on the IAB network. The method comprises: receiving, at a first network device and from a first central device for controlling the first network device, a first message comprising configuration information about at least one of duplication and de-duplication for a packet at backhaul adaptation protocol, BAP, layer; and communicating, based on the configuration information, the packet with a group of second network devices and the first central device in an integrated access and backhaul, IAB, network. By duplicating uplink and downlink data associated with terminal devices in the IAB network at BAP level, the reliability and resiliency of backhaul links can be improved.

20 Claims, 7 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2024/0163709 | A1* | 5/2024 | Mildh | H04W 76/15 |
| 2024/0196262 | A1* | 6/2024 | Teyeb | H04W 72/02 |
| 2024/0260110 | A1* | 8/2024 | Shimoda | H04W 4/06 |

OTHER PUBLICATIONS

"IAB Enhancements for Rel-17", 3GPP TSG RAN Plenary Meeting #86, RP-192709, Agenda: 9.1.2, AT&T, Dec. 9-12, 2019, pp. 1-10.
"Innovations in 5G Backhaul Technologies: IAB, HFC & Fiber", 5G Americas White Paper, Jun. 2020, 62 pages.
"CR to 38.401 on Integrated Access and Backhaul for NR", 3GPP TSG-RAN WG3 Meeting #103, R3-190188, Qualcomm, Feb. 15-Mar. 1, 2019, 16 pages.
Aijaz, "Packet Duplication in Dual Connectivity Enabled 5G Wireless Networks: Overview and Challenges", IEEE Communications Standards Magazine, vol. 3, No. 3, Sep. 2019, pp. 20-28.
International Search Report and Written Opinion received for corresponding Patent Cooperation Treaty Application No. PCT/CN2021/112888, dated Apr. 26, 2022, 9 pages.
"3rd Generation Partnership Project; Technical Specification Group Radio Access Network; NG-RAN; F1 application protocol (F1AP) (Release 16)", 3GPP TS 38.473, V16.6.0, Jul. 2021, pp. 1-463.
"(TP for E1/F1) Alignment of Radio-Related Measurement and QoE Measurements", 3GPP TSG-RAN WG3 #113-e, R3-214050, Agenda: 15.4, ZTE, Aug. 16-26, 2021, 42 pages.
"Duplication support in IAB", 3GPP TSG-RAN WG2 Meeting #104, R2-1816508, Agenda: 11.1.2, vivo, Nov. 12-16, 2018, 3 pages.
"Need for L2 Measurements enhancements", 3GPP TSG-RAN WG2 Meeting #112 Electronic, R2-2009435, Agenda: 8.14.3, Nokia, Nov. 2-13, 2020, 11 pages.

* cited by examiner

ENHANCEMENT ON INTEGRATED ACCESS AND BACKHAUL NETWORK

RELATED APPLICATION

This application claims priority to PCT Application No. PCT/CN2021/112888, filed on Aug. 17, 2021, which is incorporated herein by reference in its entirety.

FIELD

Embodiments of the present disclosure generally relate to the field of telecommunication and in particular, to devices, methods, apparatus and computer readable storage media for enhancement on integrated access and backhaul (IAB) network.

BACKGROUND

The IAB network is utilized to support wireless relaying and backhauling for 5G New Radio (NR). A relay node in the IAB architecture is called IAB-node, which provides both access and backhaul by using a NR radio access. The network node terminating the wireless backhauling on the network side is called IAB-donor gNB, which is a gNB with added functionalities to support IAB. IAB takes advantage of the split gNB architecture with the centralized unit (CU) in the IAB-donor and the distributed unit (DU) in the IAB-node, and thus the DU in the IAB-node is also called IAB DU, and the CU in the IAB-donor is also called IAB donor CU. For IAB-node, the F1 interface specified between the gNB CU and gNB DU, is extended over the wireless backhaul connecting IAB DU and the IAB donor CU. The core network interface (e.g., NG interface) terminates at the IAB donor CU. Thus, the IAB node is a radio access network node with a limited visibility to the core network. The IAB network is utilized to support the wireless backhaul.

IAB DU acts as the gNB DU that terminates the NR access interface to UEs. In addition, IAB DU terminates the backhaul link of the next-hop IAB-nodes. IAB-node also supports UE functionality which is referred to as IAB-MT (Mobile Termination). IAB-MT supports, e.g., physical layer, layer-2, RRC and NAS functionality, and IAB-MT connects the IAB-node to the IAB DU in another IAB node (multi-hop) or to the IAB donor. Furthermore, IAB-MT connects to the RRC layer in the IAB donor CU and the NAS layer in the access and mobility management Function (AMF).

SUMMARY

In general, example embodiments of the present disclosure provide a solution for enhancement on the IAB network.

In a first aspect, there is provided a first integrated access and backhaul, IAB, network device. The first IAB network device comprises at least one processor; and at least one memory including computer program codes; the at least one memory and the computer program codes are configured to, with the at least one processor, cause the first network device at least to: receive, from a first central device for controlling the first network device, a first message comprising configuration information about at least one of duplication and de-duplication for a packet at backhaul adaptation protocol, BAP, layer; and communicate, based on the configuration information, the packet with a group of second network devices and the first central device in an integrated access and backhaul, IAB, network.

In a second aspect, there is provided first central device. The first central device comprises: at least one processor; and at least one memory including computer program codes; the at least one memory and the computer program codes are configured to, with the at least one processor, cause the first central device at least to: generate a first message comprising configuration information about at least one of duplication and de-duplication for a packet at backhaul adaptation protocol, BAP, layer; transmit, to a first network device controlled by the first central device, the first message; and communicate, based on the configuration information, the packet with the first network device and a group of second network devices in an integrated access and backhaul, IAB, network.

In a third aspect, there is provided a method. The method comprises: receiving, at a first network device and from a first central device for controlling the first network device, a first message comprising configuration information about at least one of duplication and de-duplication for a packet at backhaul adaptation protocol, BAP, layer; and communicating, based on the configuration information, the packet with a group of second network devices and the first central device in an integrated access and backhaul, IAB, network.

In a fourth aspect, there is provided a method. The method comprises: generating, at a first central device, a first message comprising configuration information about at least one of duplication and de-duplication for a packet at backhaul adaptation protocol, BAP, layer; transmitting, to a first network device controlled by the first central device, the first message; and communicating, based on the configuration information, the packet with the first network device and a group of second network devices in an integrated access and backhaul, IAB, network.

In a fifth aspect, there is provided a first apparatus. The first apparatus comprises: means for receiving, from a first central device for controlling the first apparatus, a first message comprising configuration information about at least one of duplication and de-duplication for a packet at backhaul adaptation protocol, BAP, layer; and means for communicating, based on the configuration information, the packet with a group of second network devices and the first central device in an integrated access and backhaul, IAB, network.

In a sixth aspect, there is provided a second apparatus. The second apparatus comprises: means for generating a first message comprising configuration information about at least one of duplication and de-duplication for a packet at backhaul adaptation protocol, BAP, layer; means for transmitting the first message to a first network device controlled by the second apparatus; and means for communicating, based on the configuration information, the packet with the first network device and a group of second network devices in an integrated access and backhaul, IAB, network.

In a seventh aspect, there is provided a computer readable medium having a computer program stored thereon which, when executed by at least one processor of a device, causes the device to carry out the method according to the third aspect.

In an eighth aspect, there is provided a computer readable medium having a computer program stored thereon which, when executed by at least one processor of a device, causes the device to carry out the method according to the fourth aspect.

Other features and advantages of the embodiments of the present disclosure will also be apparent from the following description of specific embodiments when read in conjunction with the accompanying drawings, which illustrate, by way of example, the principles of embodiments of the disclosure.

BRIEF DESCRIPTION OF THE DRAWINGS

Embodiments of the disclosure are presented in the sense of examples and their advantages are explained in greater detail below, with reference to the accompanying drawings, where.

Throughout the drawings, the same or similar reference numerals represent the same or similar element.

DETAILED DESCRIPTION

Figure 1:
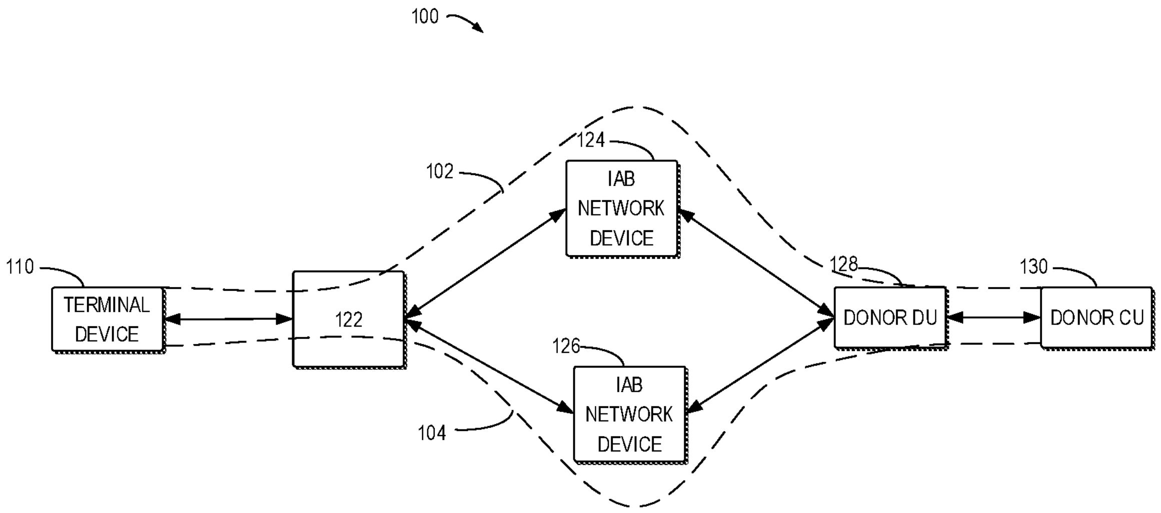
FIG. 1 illustrates an example IAB network architecture in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish functionalities of various elements. As used herein, the term "and/of" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as fifth generation (5G) systems, Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the future fifth generation (5G) new radio (NR) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), a NR Next Generation NodeB (gNB), a Remote Radio Unit (RRU), a radio header (RH), a remote radio head (RRH), Integrated Access and Backhaul (IAB) node, a relay, a low power node such as a femto, a pico, and so forth, depending on the applied terminology and technology. The network device is allowed to be defined as part of a gNB such as for example in CU/DU split in which case the network device is defined to be either a gNB-CU or a gNB-DU.

The term "terminal device" refers to any end device that may be capable of wireless communication. By way of example rather than limitation, a terminal device may also be referred to as a communication device, user equipment (UE), a Subscriber Station (SS), devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to Mobile Termination (MT) part of the integrated access and backhaul (IAB) node (a.k.a. a relay node). In the following description, the a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal terms "terminal device", "communication device", "terminal", "user equipment" and "UE" may be used interchangeably.

Although functionalities described herein can be performed, in various example embodiments, in a fixed and/or a wireless network node, in other example embodiments, functionalities may be implemented in a user equipment apparatus (such as a cell phone or tablet computer or laptop computer or desktop computer or mobile IoT device or fixed IoT device). This user equipment apparatus can, for example, be furnished with corresponding capabilities as described in connection with the fixed and/or the wireless network node(s), as appropriate. The user equipment apparatus may be the user equipment and/or or a control device, such as a chipset or processor, configured to control the user equipment when installed therein. Examples of such functionalities include the bootstrapping server function and/or the home subscriber server, which may be implemented in the user equipment apparatus by providing the user equipment apparatus with software configured to cause the user equipment apparatus to perform from the point of view of these functions/nodes.

The exemplary embodiments herein describe techniques for data duplication and de-duplication at backhaul adaptation protocol (BAP) layer in IAB networks. In the context of the present disclosure, the term "de-duplication" may refer to duplication detection and discarding of packets, and it may be functions implemented at a network node which merges the duplicated data flows by detecting and removing the duplicate packets. Example embodiments of the present disclosure will be described in detail below with reference to the accompanying drawings. Principle and embodiments of the present disclosure will be described in detail below with reference to the accompanying drawings.

FIG. 1 illustrates an example IAB network 100 in which example embodiments of the present disclosure can be implemented. The IAB network 100 includes a terminal device 110, a group of IAB network devices 122 to 128, and a first IAB central device 130, which may be also referred to as the first donor central unit (CU) 130. The IAB network device 122 connected to the terminal device 110 may be also referred to as an access IAB node 122, the IAB network device 128 connected to the first IAB central device 130 may be also referred to as the first donor distributed unit (DU), and the rest of the IAB network devices 122 to 128 may be also referred to as IAB devices.

As shown in FIG. 1, in the IAB network 100, the IAB donor architecture is split into a donor CU (e.g., the first donor CU 130) and a donor DU (e.g., the first donor DU 128). In some other cases, there may be more than one donor CU and more than one donor DU, which will be discussed later in connection with FIGS. 5-6. The IAB network device supports a DU functions and UE functions, for example, IAB mobile termination (IAB-MT). The IAB-MT may support, e.g., physical layer, layer-2, RRC and NAS functionality, and the IAB-MT may connect the IAB network devices to the DU of another IAB network device in case of multi-hop, or to the IAB donor DU. Furthermore, the IAB MT connects to the RRC layer in the IAB donor CU 130 and a NAS layer in AMF in the core network.

Figure 2:
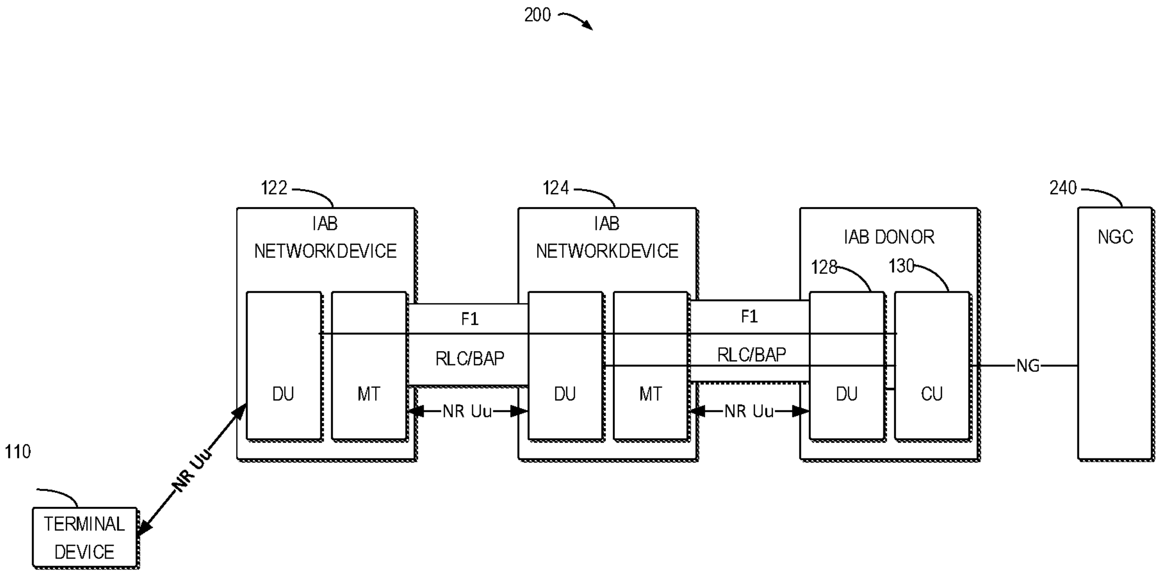
FIG. 2 illustrates an example IAB architecture and functional split.

Now turning to FIG. 2, which illustrates an example IAB architecture 200 and functional split. F1 interfaces are provided between the first donor CU 130 and the DUs in the IAB network device 122 and 124 as well as between the first donor CU 130 and the first donor DU 128. The group of IAB network devices 122 to 128 communicate with each other through links, which may be wireless and may implement, e.g., a NR Uu interfaces. Some IAB network devices communicate directly with each other, like 124 and 128 or 122 and 124, whereas others communicate via another IAB network device, like 122 communicates with 128 via 124 in which case 124 is called an intermediate IAB node. The IAB network device may act like a gNB DU that terminates a NR access interface to the terminal device 110. In addition, the DU in an IAB network device terminates a backhaul link of the next-hop IAB network devices. A core network interface (e.g., the NG interface) terminates at the first IAB donor CU 130. Thus, the IAB network devices are radio access network nodes with limited visibility to the core network.

According to the user plane (UP) protocol stack for IAB, in L2-relaying, the backhauling involves NR PHY, MAC and RLC layers as well as a new adaptation layer, namely, Backhaul Adaptation Protocol (BAP) layer. F1-U between the IAB donor DU 128 and the first IAB donor CU 130 is carried over IP layer, i.e., F1-U to the IAB donor DU 128 is from protocol stack point of view seen as a standard F1-U interface to any gNB DU. Also, F1-U between the IAB-DU 122 and the first IAB donor CU 130 is carried over IP layer, i.e., F1-U to the IAB-DU 122 is from protocol stack point of view seen as a standard F1-U interface to any gNB-DU. The full F1-U stack (GTP-U/UDP/IP) is carried on top of the BAP layer on the wireless backhaul. The BAP enables backhaul routing over multiple hops in the IAB network 100. IP layer is terminated in the access IAB node 122 in the similar way as IP is terminated in a normal gNB DU. It should be noted that IAB nodes 124 and 126 also act as access IAB nodes to other terminals connected IAB-DU 124 or IAB-DU 126, respectively (not shown in the figure).

At the BAP layer, data (e.g., BAP PDUs) are carried on backhaul RLC channels. For each of the backhaul links, there may be a plurality of backhaul RLC channels configured for allowing traffic prioritization and quality of service (QoS) enforcement. A backhaul RLC channel is configured separately for each hop, that is, backhaul RLC channel is a single hop channel and thus hop-by-hop automatic repeat request (ARQ) is supported by RLC. The data radio bearers associated with the terminal device 110 terminate in the IAB donor CU 130, i.e., service data adaptation protocol (SDAP) and packet data convergence protocol (PDCP) protocols are configured between the terminal device 110 and the IAB donor CU 130.

Figure 3:
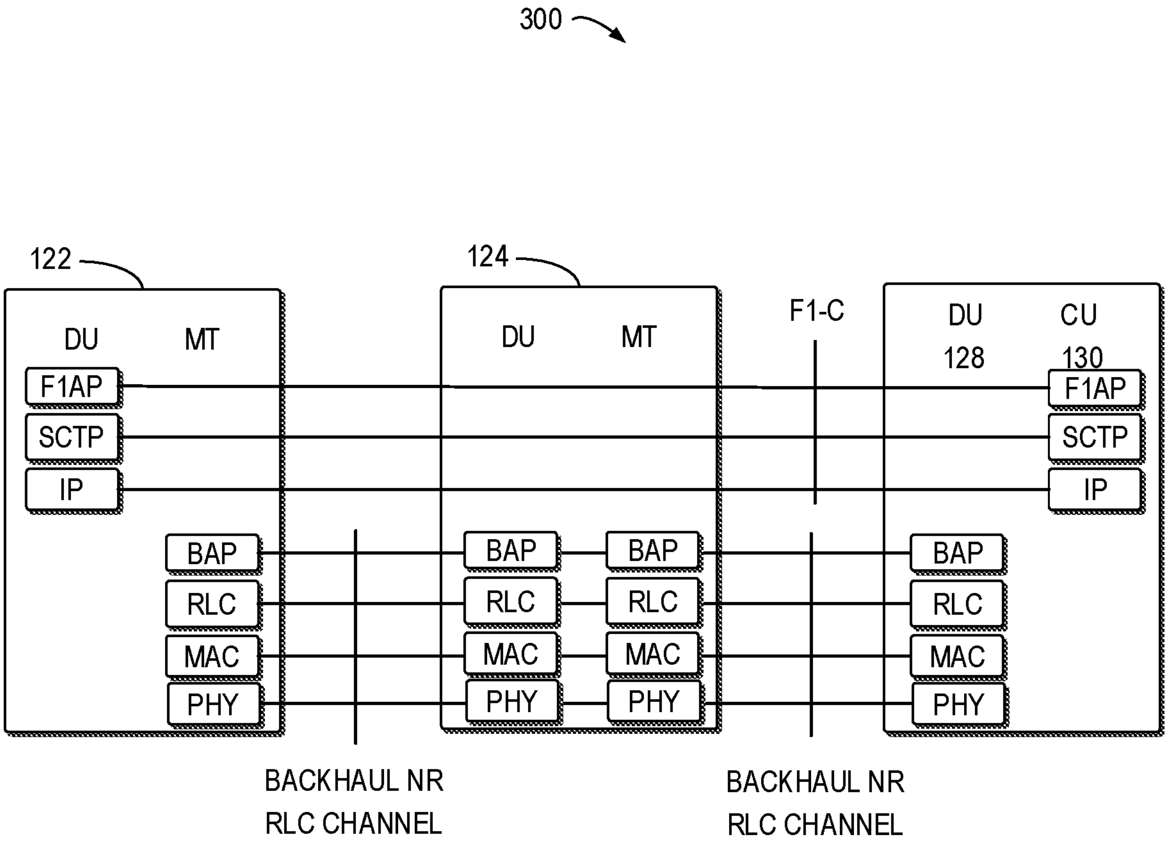
FIG. 3 illustrates example control plane (CP) protocol stacks for the IAB architecture shown in FIG. 2.

Control plane (CP) protocol stacks for IAB network 100 are shown in FIG. 3. Similar to the user plane, full F1-C stack (F1AP/SCTP/IP) is carried on top of the BAP layer over the wireless backhaul links. Control plane traffic may be carried over the dedicated backhaul RLC channel or multiplexed together with the user plane traffic. For the IAB network 100, the BAP layer is also introduced in the wireless backhaul links on top of the RLC layer. The BAP layer supports routing in the IAB topology as well as traffic mapping to backhaul RLC channels, thus enforcing traffic prioritization and QoS.

For routing in a topology of the IAB network 100, the BAP PDU is configured with a BAP PDU header that contains a BAP routing ID. The BAP routing ID consists of a 10-bit long BAP address of a destination node and a 10-bit long path ID. Based on the BAP address contained in the PDU header, each IAB nodes may check whether this BAP PDU should be delivered to upper layers of this node or forwarded to a next hop of this node. The BAP address is configured by the IAB donor CU 130 via RRC signaling when a new IAB-node is connected to the topology of the IAB network 100.

The Path ID is used to differentiate multiple routes (e.g., routes 102 and 104) leading to the same destination node, i.e., the IAB donor DU 128 in upstream direction or the IAB-node 122 in downstream direction. By mapping data radio bearers of the terminal device 110 to different routes, a centralized load balancing can be achieved. The mapping of data radio bearers of the terminal device 110 to the Path ID is configured by IAB donor CU 130 via a F1AP signaling and implemented by the IAB donor DU 128 for downlink transmission while by the access IAB node 122 for uplink transmission.

The routing configuration is provided to the group of IAB network devices 122 to 128 via F1AP signaling for defining the mapping between the BAP Routing ID contained in the BAP PDU header and including the BAP address and the path ID and the BAP address of the next hop node. The routing configuration of an IAB node may include multiple entries with the same destination BAP address but different path IDs. Thus, for a given IAB node, these entries may point to the same or different egress backhaul links.

An intermediate IAB node may redirect the BAP PDU to another path leading to the same destination BAP address in case of a radio link failure (RLF) on the link indicated by the path ID in the BAP header. In upstream, each IAB node may be simultaneously connected to two parent nodes using the NR dual connectivity between the IAB MT and the DUs of IAB nodes as parent nodes.

The terminal device 110 may communicate data (e.g., PDCP PDU) with the first donor CU 130 in uplink and downlink directions via the group of IAB network devices 122 to 128. In the IAB network 100, the backhaul links closer to the donor node (e.g., the first donor DU 128) may aggregate more traffic flows and therefore, these backhaul links should be very reliable and resilient. The reliability and resilience of backhaul links which aggregate traffic flows from several terminal devices are more important than the reliability and resilience of a single access link to a terminal device. In a case where the IAB network 100 is used for services with a high requirement on reliability and so on, for example, URLLC, the resilience and reliability of the backhaul links become even more important.

According to the example embodiments of the present disclosure, the reliability and resiliency of backhaul links can be improved by duplication of uplink and downlink backhaul data in the IAB network 100 at BAP level. The presented solution works nicely also with IPsec, since the duplication at BAP is handled between IAB network devices, and, therefore, there is only one security association involved. In addition, to merge the duplicated data before being delivered to the destination node, duplication detection and discard for the duplicated data can be performed by the IAB nodes for DL or UL or by IAB donor DU for UL.

It is to be understood that the number of terminal devices and network devices shown in FIG. 1 is given for the purpose of illustration without suggesting any limitations. The network system 100 may include any suitable number of terminal devices, network devices and additional devices adapted for implementations of the present disclosure.

The IAB network devices shown in FIG. 1, including the access IAB node, the intermediate IAB nodes, the IAB donor DU, the IAB donor CU may be, for instance, a base station for 5G, also called New Radio (NR). In 5G, the IAB node may be a NG-RAN node, which is defined as either a gNB or an ng-eNB. As a clarification, in non-stand-alone (NSA) network, an IAB can be deployed with an EN-DC (EUTRAN NR Dual Connectivity) connection, where the serving node for an IAB node can be an eNB (Master Node). However, the eNB provides only the control interface and the backhaul (BH) (e.g., data) is carried over a NR leg of DC. A gNB is a node providing NR user plane and control plane protocol terminations towards the UE, and connected via the NG interface to a 5GC (e.g., the core network elements). The NG-eNB is a node providing E-UTRA user plane and control plane protocol terminations towards the UE, and connected via the NG interface to the 5GC. The NG-RAN node may include multiple gNBs, which may also include a central unit (CU) (gNB-CU) and distributed unit(s) (DUs) (gNB-DUs). Note that the DU may include or be coupled to and control a radio unit (RU). The gNB-CU is a logical node hosting RRC, SDAP and PDCP protocols of the gNB or RRC and PDCP protocols of the en-gNB. One gNB-CU may support one or multiple gNB-DUs. One gNB-DU may support one or multiple cells. One cell is supported by only one gNB-DU.

Depending on the communication technologies, the IAB network 100 may be a Code Division Multiple Access (CDMA) network, a Time Division Multiple Address (TDMA) network, a Frequency Division Multiple Access (FDMA) network, an Orthogonal Frequency-Division Multiple Access (OFDMA) network, a Single Carrier-Frequency Division Multiple Access (SC-FDMA) network or any others. Communications discussed in the network 100 may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols. The techniques described herein may be used for the wireless networks and radio technologies mentioned above as well as other wireless networks and radio technologies. For clarity, certain aspects of the techniques are described below for NR, and NR terminology is used in much of the description below.

Figure 4:
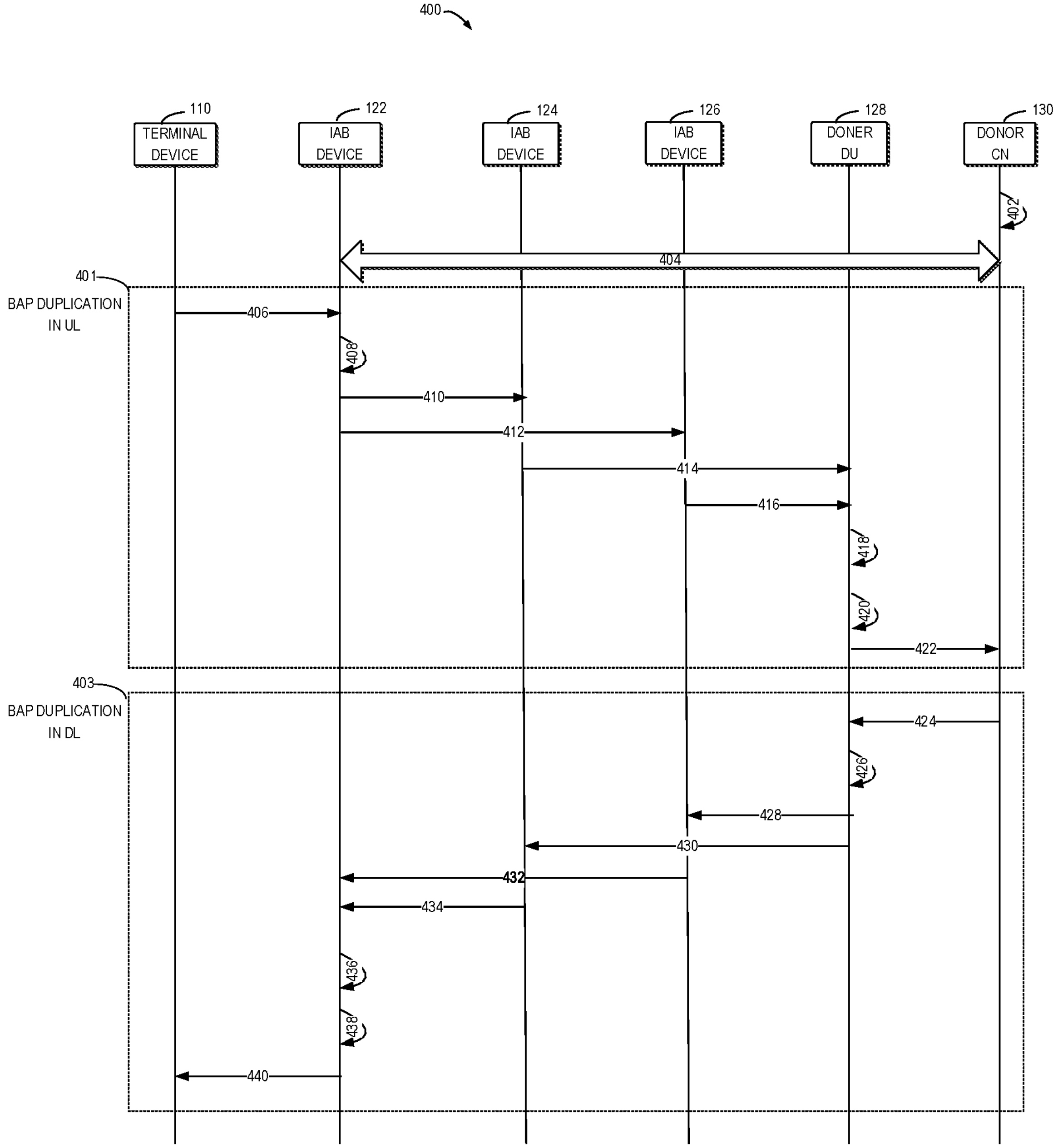
FIG. 4 shows a signaling chart illustrating a process of BAP level duplication according to some example embodiments of the present disclosure.

Principle and implementations of the present disclosure will be described in detail below with reference to FIGS. 4 to 8. FIG. 4 shows a signaling chart illustrating a process 400 of BAP level duplication according to some example embodiments of the present disclosure. For the purpose of discussion, the process 400 will be described with reference to FIG. 1. The process 400 may involve the terminal device 110, the group of IAB network devices 122 to 128, and the first IAB central device 130. Some of the operations in process 400 may be described with reference to FIGS. 5-6 which illustrate the example IAB network architecture 500 involving inter donor DU duplication and the example IAB network architecture 600 involving the inter donor CU.

The IAB donor CU 130 controls the BAP level duplication including data duplication, and duplication discard in the IAB network 100. The IAB donor CU 130 generates 402 a first message comprising configuration information about at least one of duplication and de-duplication for data (which may or may not be associated with the terminal device 110) at BAP layer. The configuration information is used for configuring which of traffic flows in the IAB network 100 is to be duplicated and for which backhaul links, as well as when the duplicated traffic flows are to be merged, for example, by discarding duplicates of a target traffic flow.

In some example embodiments, the configuration information indicates that the data to be duplicated is identified by at least one of the following parameters:

a BAP flow identification (ID) for a traffic flow comprising the data,
an ingress backhaul RLC channel,
an egress backhaul RLC channel,
a destination IP address,
a source IP address,
a packet priority, for example, differentiated services code point (DSCP) in the IP header,
a IPv6 flow label in IP header,
a BAP routing ID,
a non-UP traffic type (Non-UP traffic here means F1-C traffic or non-F1-C control traffic, like SCTP or IPsec traffic),
a tunnel IP address,
a tunnel endpoint ID (TEID), or
a BAP address for a IAB network device as a next hop node.

Figure 5:
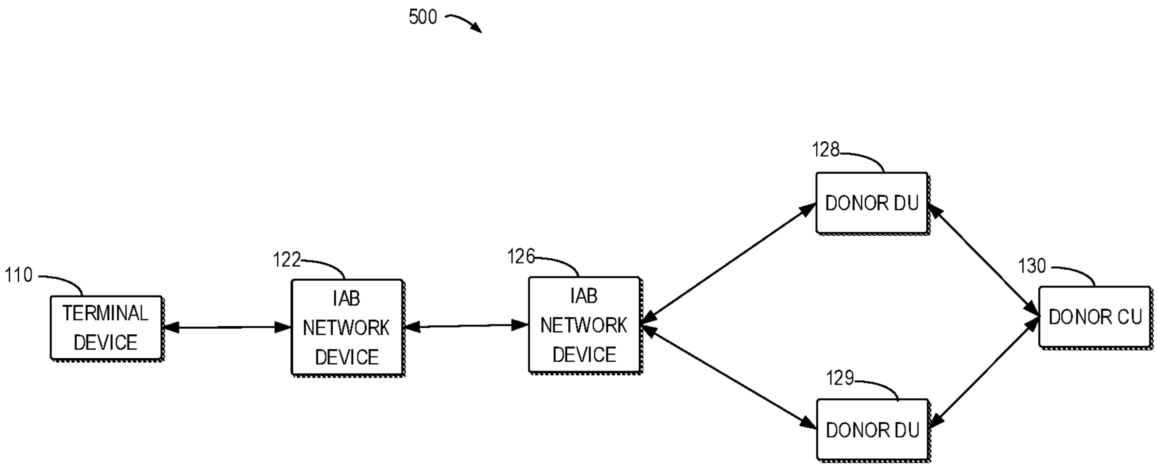
FIG. 5 illustrates an example IAB network architecture in which example embodiments of the present disclosure can be implemented.

The group of IAB network devices may comprise at least one IAB donor DU device and a plurality of IAB devices. For example, as shown in FIG. 1, the group of IAB network devices includes the first donor DU 128 and a plurality of IAB devices 122 to 126. For another example, as shown in FIG. 5, the group of IAB network devices includes more than one donor DU, i.e., the first donor DU 128 and a second donor DU 129, and multiple IAB devices 122 and 126. In this example, the first donor DU 128 and a second donor DU 129 may perform the inter donor DU duplication.

Figure 6:
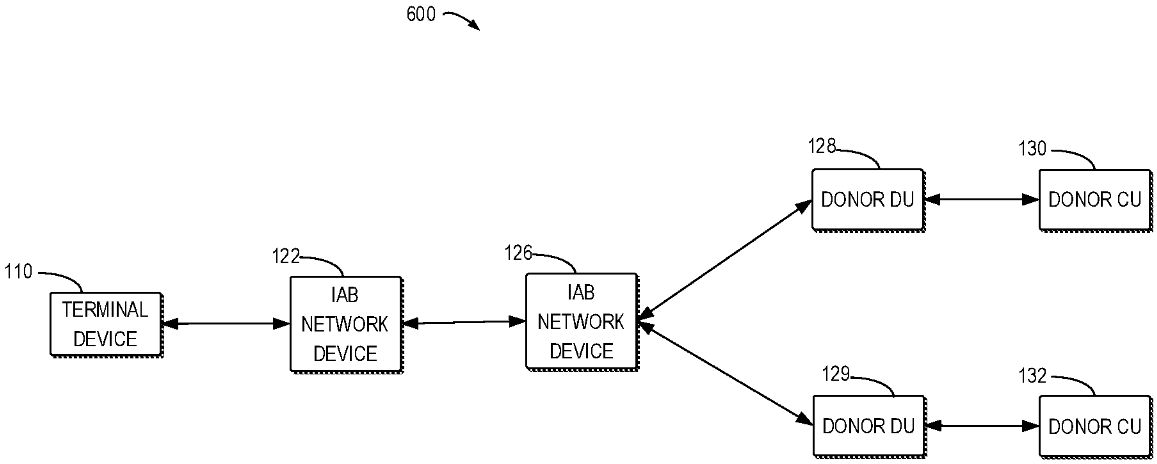
FIG. 6 illustrates an example IAB network architecture in which example embodiments of the present disclosure can be implemented.

In some example embodiments, there may be more than one IAB donor CU in the IAB network 100. As shown in FIG. 6, which illustrates an example IAB network architecture 600 in which example embodiments of the present disclosure can be implemented, the first IAB donor DU 128 and some of the IAB devices 122 and 126 are controlled by the first IAB donor CU 130, while the second IAB donor DU 129 is controlled by the second IAB donor CU 132.

The IAB donor CU 130 transmits 404 the first message to at least one of a group of IAB network devices 122 to 128. At least part of the group of IAB network devices 122 to 128 are controlled by the IAB donor CU 130. In some example embodiments, the first message comprising configuration information may be transmitted via a F1AP signaling.

As such, the IAB donor CU 130 communicates the data with the group of IAB network devices 122 to 128 based on the configuration information, and if the data is associated with the terminal device 110, the data is communicated to the terminal device 110. The communication in the IAB network 100 may involve BAP duplication in uplink as shown in sub process 401, and BAP duplication in downlink as shown in sub process 403, which will be discussed in details below. It should be understood that in the context of the disclosure, the term "BAP duplication" may refer to any one or more of duplication, duplication detection and duplication discard of the traffic flows.

In the sub process 401 for uplink direction, that is, routing data associated with the terminal device 110 to the first IAB donor CU 130 through the group of IAB network devices 122 to 128, the terminal device 110 may transmit 406 data to its access IAB node 122. For upstream, the BAP duplication may be implemented at the access IAB node or any of the intermediate IAB nodes.

In the embodiments where BAP duplication is implemented at the access IAB node, the access IAB node 122 may determine whether the data associated with the terminal device 110 is to be duplicated based on the configuration information. If the data comprises at least one of parameters indicated by the configuration information, then the access IAB node 122 may determine that the data is to be duplicated into multiple traffic flows.

For the access IAB node, the parameters indicated by the configuration information may comprises any one of the following or their combinations:

a non-UP traffic type,
a tunnel IP address,
a TEID,
a destination IP address,
a source IP address,
a DSCP,
a routing ID, or
an egress backhaul RLC channel.

For example, if the packets transmitted from the terminal device 110 or packets generated in the IAB device (e.g., F1-C or non-F1-C packets) are configured with the IP address and a TEID, or with the non-UP traffic type, the access IAB node 122 may determine that these packets are to be duplicated at BAP layer.

For another example, if the packets transmitted from the terminal device 110 or packets generated in the IAB device (e.g., F1-C or non-F1-C packets) are configured with the routing ID, which may be determined based on the IP address and the TEID, or configured with a non-UP traffic type, the access IAB node 122 may determine that these packets are to be duplicated at BAP layer.

For still another example, if the packets transmitted from the terminal device 110 or packets generated in the IAB device (e.g., F1-C or non-F1-C packets) are towards an egress backhaul RLC channel, which may be determined based on the IP address and the TEID or a non-UP traffic type, the access IAB node 122 may determine that these packets are to be duplicated at BAP layer.

For yet another example, if the packets transmitted from the terminal device 110 or packets generated in the IAB device (e.g., F1-C or non-F1-C packets) are configured with any one of a DSCP, a destination IP address, a source IP address and their combinations, the access IAB node 122 may determine that these packets are to be duplicated at BAP layer.

If the data is determined to be duplicated, the access IAB node 122 may then generate 408 multiple traffic flows comprising the data. In generating the multiple traffic flows, the access IAB node 122 may add a BAP sequence number (SN) to the headers of the duplicated packets.

In some example embodiments, in addition to the BAP SN, the access IAB node 122 may add the BAP flow ID to the headers of the duplicated packets. For example, if multiple duplicated traffic flows are multiplexed into the same backhaul RLC channels and use the same routing ID, the access IAB node 122 may further add the BAP flow ID to the header of the duplicated packets. At least one of the reserved bits in the header of the BAP PDU may be reserved for indicative of the presence of the BAP SN and the BAP flow ID, i.e., indicative of a new BAP header type.

The access IAB node 122 may transmit 410, 412 the multiple traffic flows to IAB network devices 124 and 126, as next hops of the first IAB network device, in the group, respectively. In some example embodiments, the access IAB node 122 may determine how the data associated with the terminal device 110 is duplicated based on the BAP address for the next hop and/or the ID of the backhaul RLC channel indicated by the configuration information. From such configuration information, the access IAB node 122 may determine where the multiple traffic flows are to be sent, or in other words, to which of the paths the duplicated packets are supposed to be routed.

In the uplink direction, the duplication detection and discard may be implemented at the intermediate IAB node or an IAB donor DU. As shown in FIG. 4, upon receipt of the multiple traffic flows from the access IAB node 122, the intermediate IAB nodes 124 and 126 may determine that corresponding traffic flows each comprising duplicated packets based on the BAP SN and the BAP flow ID (if any), respectively. In the example, the intermediate IAB nodes 124 and 126 are configured to forward the (duplicated) BAP PDUs.

The intermediate IAB nodes 124 and 126 may then forward 414 and 416 the corresponding traffic flows to their next hop, i.e., the IAB donor DU 128. Likewise, the IAB donor DU 128 may detect 418 the BAP duplication based on the BAP SN and the BAP flow ID (if any).

The IAB donor DU 128 may determine whether that the multiple traffic flows are to be merged based on a preconfigured condition associated with a target traffic flow. The preconfigured condition may include that the target traffic flow is identified with at least one of parameters indicated by the configuration information. For example, the configuration information may indicate that the traffic flow comprising duplicated packets with a packet header comprising a BAP flow ID or a routing ID is to be merged at the IAB donor DU 128.

If the preconfigured condition is met, the IAB donor DU 128 may determine 418 that the multiple traffic flows are to be merged. The IAB donor DU then detects the duplicated packets based on the BAP SN and discards the duplicates (420). The IAB donor DU 128 transmits 422 one traffic flow to its next hop, i.e., the first IAB donor CU 130, where the one traffic flow does not contain duplicates.

In some example embodiments, after duplication detection and discard, BAP SN may be removed, for example, if the subsequent hops in the IAB network 100 do not require duplication. Likewise, the BAP flow ID may be removed. The removal of the BAP SN and BAP Flow ID may be configured by the first donor CU 130 via the F1AP signaling.

Turning to FIG. 5, where the BAP duplication is implemented at the intermediate IAB node 126, and one of the IAB donor DUs may tunnel the duplicated traffic flow to the other one for handling the duplication detection and discard. Likewise, the intermediate IAB node 126 may determine whether the data is to be duplicated based on the configuration information, and if the data comprises at least one of parameters indicated by the configuration information, the intermediate IAB node 126 may determine that the data is to be duplicated into multiple traffic flows.

In the above embodiments, the parameters indicated by the configuration information may comprises any one of the following or its combinations:

a BAP flow ID, an ingress backhaul RLC channel ID, an egress backhaul RLC channel ID, or a routing ID.

For example, if BAP PDUs received from the IAB node 122 contain the BAP flow ID in the BAP header, the intermediate IAB node 126 may determine that these BAP PDUs are to be duplicated at BAP layer.

For another example, if the packets received from the IAB node 122 are received from a configured ingress backhaul RLC channel, or alternatively, these packets are configured to be sent to an egress backhaul RLC channel, the intermediate IAB node 126 may determine that these packets are to be duplicated at BAP layer.

For still another example, if the packets received from the IAB node 122 are having a routing ID in the BAP header, the intermediate IAB node 126 may determine that these packets are to be duplicated at BAP layer.

For yet another example, if the packets received from the IAB node 122 with any combinations of a BAP flow ID, an ingress backhaul RLC channel ID, an egress backhaul RLC channel ID and a routing ID, the intermediate IAB node 126 may determine that these packets are to be duplicated at BAP layer.

The intermediate IAB node 126 may then generate multiple traffic flows like step 408, and transmit the multiple traffic flows to its next hops, i.e., the first IAB donor DU 128 and the second IAB donor DU 129. Since both of the first IAB donor DU 128 and the second IAB donor DU 129 receive a corresponding traffic flow, inter donor DU duplication is implemented between the first IAB donor DU 128 and the second IAB donor DU 129.

As one of the implementations for inter donor DU duplication, one of the first IAB donor DU 128 and the second IAB donor DU 129 may route the duplicated traffic flow to the other one. For example, the second IAB donor DU 129 may tunnel the duplicated BAP PDUs to the first IAB donor DU 128 based on at least one of the BAP flow ID, ingress backhaul RLC channel ID, the source IP address or the BAP routing ID. Upon receipt of the duplicated BAP PDUs, the first IAB donor DU 128 may perform the duplication detection and discard based on the BAP SN, the BAP flow ID, the BAP routing ID(s), and/or ingress backhaul RLC channel IDs, which is similar to the discussion above. If the duplicate detection is done based on the ingress backhaul RLC channel ID, the second IAB donor DU 129 has to provide the ingress backhaul RLC channel ID to the first IAB donor DU 128. In this case, the first IAB donor DU 128 then transmits the first traffic flow without any duplicated packets to the first IAB donor CU 130.

Turning to FIG. 6, which shows an inter-CU case where the BAP duplication is implemented at the intermediate IAB node 126, and the first IAB donor CU 130 controls a first subset of the group of IAB network devices 122 to 128, while the second IAB donor CU 132 controls a second subset of the group of IAB network devices, e.g., 129, potentially also 126. Similar to the example shown in FIG. 5, the second IAB donor DU 129 may tunnel the duplicated packets to the first IAB donor DU 128 for the duplication detection and discard. The first IAB donor CU 130 may configure the first subset of the group of IAB network devices with first configuration information, while the second IAB donor CU 132 may configure the second subset of the group of IAB network devices with second configuration information, and the first and second configuration information may or may not be the same. In this case, coordination between the first and second donor CUs 130 and 132 may be needed over Xn interface. For example, one of the first and second donor CUs 130 and 132 may tell the other one the BAP header fields to be used for the duplicated packets routed via a corresponding IAB donor DU controlled by the other donor CU as well as the tunnel information.

In the sub process 403 for downlink direction, that is, routing data from the first IAB donor CU 130 through the group of IAB network devices 122 to 128 and potentially to the terminal device 110. The first IAB donor CU 130 may transmit 424 data to the first IAB donor DU 128. For downstream, the BAP duplication may be implemented at the IAB donor DU or any of the intermediate IAB nodes.

In the embodiments where BAP duplication is implemented at the first IAB donor DU 128, the first IAB donor DU 128 may determine whether the data is to be duplicated based on the configuration information. If the data comprises at least one of parameters indicated by the configuration information, then the first IAB donor DU 128 may determine that the data is to be duplicated into multiple traffic flows or multiple data/traffic paths.

For the IAB donor DU, the parameters indicated by the configuration information may be information available in the IP header of the IP packet received for relaying. For example, the parameters may include any one of the following or their combinations:

- a destination IP address,
- a flow label,
- a DSCP,
- a routing ID, or
- an egress backhaul RLC channel.

For example, if the packets transmitted from the first donor CU 130 are having in the IP header any one of a destination IP address, a flow label, a DSCP or their combinations, the first IAB donor DU 128 may determine that these packets are to be duplicated at BAP layer.

For another example, if the packets transmitted from the first donor CU 130 are configured to be sent with a routing ID, which may be determined based on the destination IP address, the flow label or the DSCP, the first IAB donor DU 128 may determine that these packets are to be duplicated at BAP layer.

For still another example, if the packets transmitted from the first donor CU 130 are configured to be sent to an egress backhaul RLC channel, which may be determined based on the destination IP address, the flow label or the DSCP, the first IAB donor DU 128 may determine that these packets are to be duplicated at BAP layer.

If the data is determined to be duplicated, similar to step 408, the first IAB donor DU 128 may then generate 426 multiple traffic flows comprising the duplicated data. In generating the multiple traffic flows, the first IAB donor DU 128 may add a BAP SN to the headers of the duplicated packets.

The first IAB donor DU 128 may transmit 428, 430 the multiple traffic flows to the intermediate IAB network devices 124 and 126, as next hops of the first IAB donor DU 128, in the group, respectively. In some example embodiments, the first IAB donor DU 128 may determine how the data packet is duplicated based on the BAP address for the next hop and/or the ID of the backhaul RLC channel indicated by the configuration information. From such configuration information, first IAB donor DU 128 may determine where the multiple traffic flows are to be sent, or in other words, to which of the paths the duplicated packets is supposed to be routed.

In the downlink direction, the duplication detection and discard may be implemented at the intermediate IAB node or the access IAB node. As shown in FIG. 4, upon receipt of the multiple traffic flows from the first IAB donor DU 128, the intermediate IAB nodes 124 and 126 may determine that corresponding traffic flows each comprising duplicated packets based on the BAP SN and the BAP flow ID (if any), respectively. In this example, the intermediate IAB nodes 124 and 126 are configured to forward the duplicated packets to IAB node 122.

The intermediate IAB nodes 124 and 126 may then forward 432 and 434 the corresponding traffic flows to their next hop, i.e., the access IAB node 122. Likewise, the access IAB node 122 may detect the BAP duplication based on the BAP SN and the BAP flow ID (if any).

The access IAB node 122 may determine whether that the multiple traffic flows are to be merged based on a preconfigured condition associated with a target traffic flow. The preconfigured condition may include that the target traffic flow is identified with at least one of parameters indicated by the configuration information. As previously described, the configuration information may indicate that the traffic flow comprising duplicated packets with a packet header comprising a BAP flow ID or a routing ID is to be merged at the access IAB node 122.

If the preconfigured condition is met, the access IAB node 122 may determine 436 that the multiple traffic flows are to be merged. The IAB node 122 then detects the duplicated packets based on the BAP SN and discards the duplicates. The access IAB node 122 discards 438 the duplicated packets based on the BAP SN. The access IAB node 122 then transmits 440 a single traffic flows to its destination node, i.e., the terminal device 110, where the single traffic flow does not contain duplicates.

Turning to FIG. 5, where the BAP duplication is implemented at the IAB donor DU 128, and the IAB donor DU 128 tunnels the duplicated traffic flow to the IAB donor DU 129. Likewise, the IAB donor DU 128 may determine whether the data is to be duplicated based on the configuration information, and if the data comprises at least one of parameters indicated by the configuration information, the IAB donor DU 128 may determine that the data is to be duplicated into multiple traffic flows.

Figure 7:
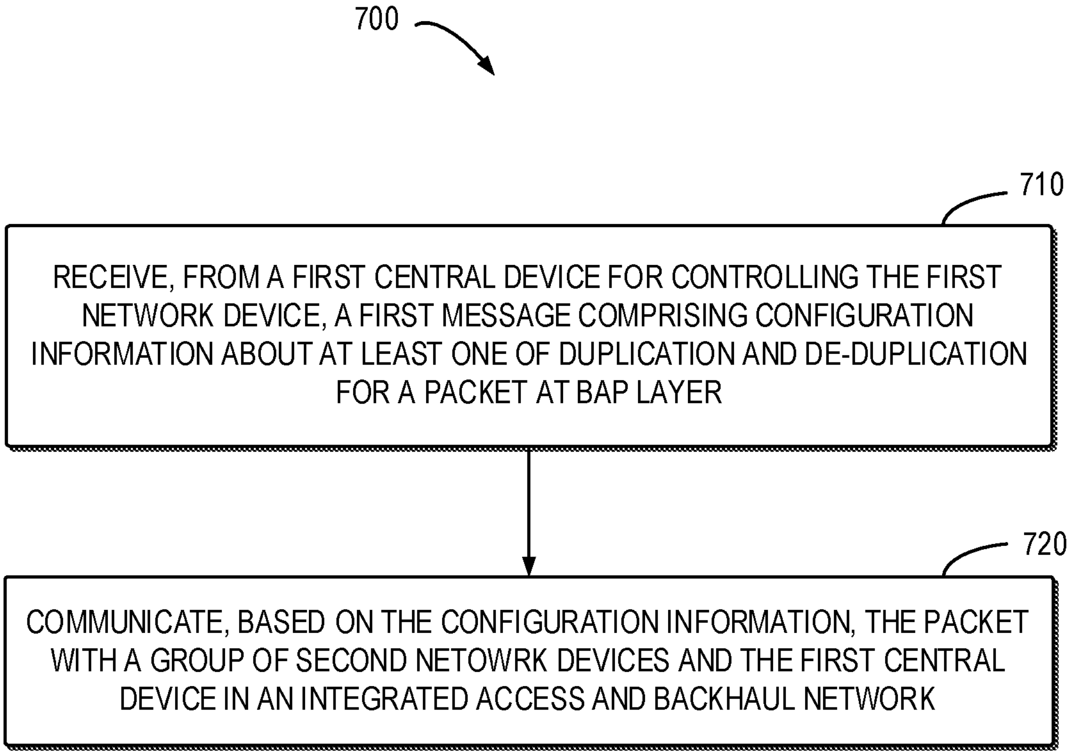
FIG. 7 illustrates a flowchart of an example method according to some example embodiments of the present disclosure.

FIG. 7 illustrates a flowchart of an example method 700 according to some example embodiments of the present disclosure. The method 700 can be implemented at an IAB network device, e.g., any one of the group of IAB network devices 122 to 129 described with reference to FIGS. 1, 5 and 6.

At 710, the first network device receives, from a first central device for controlling the first network device, a first message comprising configuration information about at least one of duplication and de-duplication for a packet at BAP layer.

In some example embodiments, the configuration information indicates that the packet to be duplicated is identified by at least one of the following parameters: a BAP flow identification for a traffic flow comprising the packet; an ingress backhaul radio link control, RLC, channel; an egress backhaul RLC channel; a destination IP address; a source IP address; a packet priority (e.g. DSCP); a IPv6 flow label; a routing identification; a non-UP traffic type; a tunnel IP address; a tunnel endpoint identification; or a BAP address for a IAB network device as a next hop of the first IAB network device.

In some example embodiments, the configuration information indicates that a duplicated packet with a packet header comprising at least one of the following is to be merged: a BAP flow identification for a traffic flow comprising the duplicated packet, or a routing identification for the duplicated packet. In another embodiment, IAB network device merges two traffic flows by detecting and discarding duplicates if they have the same BAP flow ID or the same BAP routing ID, i.e., the merging may happen also without configuration.

At 720, the first network device communicates, based on the configuration information, the packet with a group of second network devices and the first central device in the IAB network 100.

In some example embodiments, to communicate the packet, the first network device may receive the packet. The first network device may determine whether the packet comprises at least one of parameters indicated by the configuration information. In some example embodiments, the packet is associated with the terminal device 110.

If the packet comprises at least one of the parameters, the first network device may determine that the packet is to be duplicated into multiple traffic flows. The first network device may generate the multiple traffic flows by adding a BAP sequence number to each duplicated packet. The first network device may transmit the multiple traffic flows to multiple second network devices in the group acting as next hops of the first network device for communicating the packet.

In some example embodiments, the packet is to be duplicated into the multiple traffic flows associated with a routing identification, and a packet not to be duplicated is associated with a different routing identification.

In some example embodiments, to generate the multiple traffic flows, the first network device may determine whether the packet is to be duplicated into the multiple traffic flows. If the packet is to be duplicated into the multiple traffic flows, the first IAB network device may generate the multiple traffic flows with the BAP sequence number and a BAP flow identification for the multiple traffic flows.

In some example embodiments, the packet is received from a terminal device, and the first network device is a network node connected to the terminal device for accessing the IAB network.

In the above embodiments, the parameters indicated by the configuration information may include at least one of the following: an egress backhaul radio link control, RLC, channel, a destination IP address, a source IP address, a packet priority, a routing identification, a non-UP traffic type, a tunnel IP address, or a tunnel endpoint identification.

In some example embodiments, the first network device may be a first intermediate network node in the IAB network, the packet is received from a second network device in the group in a uplink direction, and the next hops of the first network device comprise one of a plurality of IAB donor distributed devices, a plurality of third intermediate IAB nodes or a combination of IAB donor DU devices and intermediate IAB nodes.

In the above embodiments, the first IAB network device may be a first intermediate network node, the packet is received from a second network device in the group in a downlink direction, the second network device comprises a IAB donor distributed device or a third intermediate network node or a combination of the IAB donor distributed device and third intermediate IAB network node, and the next hops of the first network device comprise a plurality of fourth intermediate network nodes.

In the above embodiments, the parameters indicated by the configuration information comprise at least one of the following: a BAP flow identification for a traffic flow comprising the packet; an ingress backhaul radio link control, RLC, channel; an egress backhaul RLC channel; or a routing identification.

In the above embodiments, the first network device is a first IAB donor distributed device, the packet is received from the first central device in the downlink direction, and the next hops comprise a plurality of intermediate network nodes.

In the above embodiments, the parameters indicated by the configuration information may include at least one of the following: an egress backhaul RLC channel; a destination IP address; a packet priority; a flow label, or a routing identification.

In the above embodiments, the first network device may then tunnel, to a second donor distributed device, one of the multiple traffic flows.

In some example embodiments, to communicate the packet, the first network device may receive a first packet from one of the second network devices. The first network device may determine whether a preconfigured condition associated with the first packet is met. If the preconfigured condition associated with the first packet is met, the first network device may determine that the first packet is a duplication of a previously received packet. In this case, the first network device may detect the duplicated packets based on the BAP SN and discards the duplicates and discard the first packet. In some example embodiments, the first network device may then transmit a single traffic flow to a next hop of the first network device.

In the above embodiments, the first IAB network device may be a first IAB donor distributed device, the second network device comprises one of a second IAB donor distributed device or an intermediate IAB network node, and the next hop is the first central device, the preconfigured condition comprises the first packet being identified with at least one of parameters indicated by the configuration information, and wherein the parameter comprises at least one of the followings: a BAP sequence number, a BAP flow identification; a routing identification; or an ingress backhaul radio link control, RLC, channel.

In the above embodiments, the first network device may be a first intermediate IAB network node, and the next hop comprises one of a second intermediate IAB network node or an IAB donor distributed device, the preconfigured condition comprises the first packet being identified with at least one of parameters indicated by the configuration information while no duplication for the first packet to be performed at next one or more hops of the first network device. In this case, the parameter may include at least one of the followings: a BAP sequence number, or a BAP flow identification.

In some example embodiments, the first network device may receive, from the first central device, a second message indicating removal of at least one additional parameter from the previously received packet. The additional parameter may include, for example, at least one of the following: a BAP sequence number of the first traffic flow, or a BAP flow identification. In this case, prior to transmitting the previously received packet to the next hop, where the duplications have been discarded, the first network device may remove the additional parameter from the previously received packet.

In some example embodiments, the first network device may communicate the packet with a terminal device in the IAB network.

In some example embodiments, the first central device is a IAB donor central unit, and the group of second network devices comprises at least one IAB donor distributed unit and a plurality of IAB network nodes.

Figure 8:
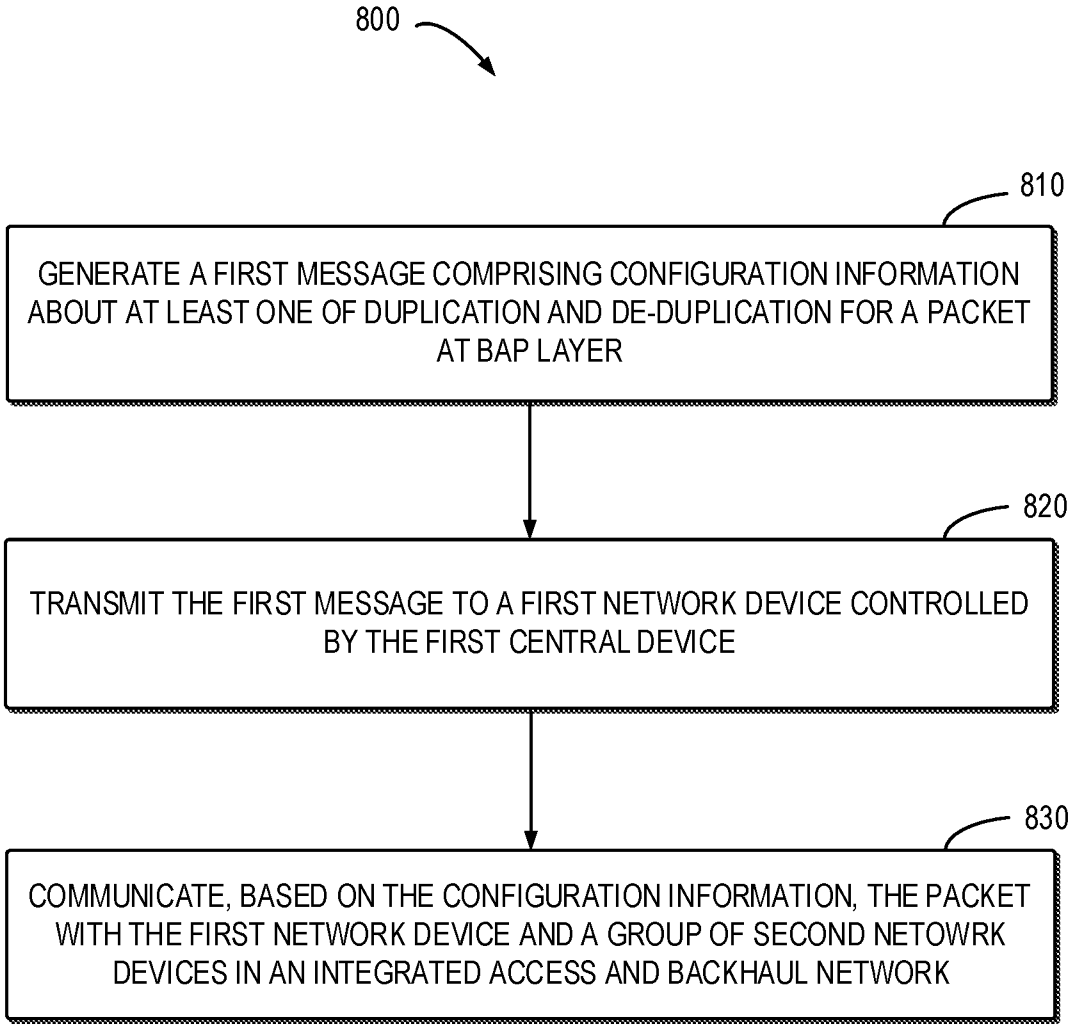
FIG. 8 illustrates a flowchart of an example method according to some example embodiments of the present disclosure.

FIG. 8 illustrates a flowchart of an example method 800 according to some example embodiments of the present disclosure. The method 800 can be implemented at an IAB central device, e.g., any one of the devices 130 to 132 described with reference to FIGS. 1, 5 and 6.

At 810, the first central device generates a first message comprising configuration information about at least one of duplication and de-duplication for a packet at BAP layer.

At 820, the first central device transmits the first message to a first network device controlled by the first central device. In some example embodiments, the first message may be a routing configuration signaling message.

In some example embodiments, the configuration information indicates that the packet to be duplicated may be identified by at least one of the following parameters: a BAP flow identification for a traffic flow comprising the packet; an ingress backhaul radio link control, RLC, channel; an egress backhaul RLC channel; a destination IP address; a source IP address; a packet priority; a flow label; a routing identification; a non-UP traffic type; a tunnel IP address; a tunnel endpoint identification; or a BAP address for a IAB network device as a next hop of the first IAB network device.

In some example embodiments, the first network device is an IAB donor distributed device, and the configuration information indicates that a packet to be duplicated in a downlink direction based on at least one of the following parameters: a destination IP address; a packet priority; a flow label; or the configuration indicates that the packet to be duplicated in a downlink direction is to be sent to an egress backhaul RLC channel; or with a routing identification.

In some example embodiments, the first network device is a network device connected to a terminal device for accessing the IAB network, and the configuration information indicates that a packet to be duplicated in an uplink direction is associated with a non-UP traffic type; a tunnel IP address; or a tunnel endpoint identification or a packet to be duplicated in an uplink direction is with a packet header comprising at least one of the following parameters: a destination IP address; a source IP address; a packet priority; or the packet to be duplicated in an uplink direction is to be sent to an egress backhaul RLC channel; or with a routing identification.

In some example embodiments, the first network device is an intermediate network device acting as a parent node connected to at least one child node in the group, and the configuration information indicates that the packet is to be duplicated in either an uplink direction or a downlink direction based on at least one of the following parameters: a BAP flow identification for a traffic flow comprising the packet; an ingress backhaul RLC channel; an egress backhaul RLC channel; a routing identification.

In some example embodiments, the configuration information indicates that a duplicated packet with a packet header comprising at least one of the following is to be merged: a BAP flow identification for a traffic flow comprising the duplicated packet, or a routing identification for the duplicated packet.

In some example embodiments, the first central device may transmit, to the first network device, a second message indicating removal of at least one additional parameter from a packet header of a packet to be forwarded to a next hop of the at least one IAB network device. The additional parameter may include, for example, at least one of the following: a BAP sequence number of the packet, or a BAP flow identification for a traffic flow comprising the packet.

In some example embodiments, the first central device may transmit, to a second central device controlling a second subset of the group of second network devices, a third message comprising BAP header fields to be used for duplication of the packet and tunnel information about an IAB donor distributed device in the second subset. In this case, the first central device controls a first subset of the group of second network devices, and the first subset is not overlapped with the second subset.

At 830, the first central device communicates, based on the configuration information, the packet with the first network device and a group of second network devices in the IAB network.

In some example embodiments, the first central device may communicate the packet with a terminal device via the IAB network. The communicated packet may be associated with the terminal device.

In some example embodiments, the first central device may be a IAB donor central unit, and the first network device and the second network devices comprise at least one IAB donor distributed unit and a plurality of IAB network nodes.

In some example embodiments, a first apparatus capable of performing the method 700 (for example, the first IAB network device) may comprise means for performing the respective steps of the method 700. The means may be implemented in any suitable form. For example, the means may be implemented in a circuitry or software module. In some embodiments, the means may comprise at least one processor and at least one memory including computer program code. The at least one memory and computer program code are configured to, with the at least one processor, cause performance of the first apparatus.

In some example embodiments, the first apparatus comprises: means for receiving, from a first central device for controlling the first apparatus, a first message comprising configuration information about at least one of duplication and de-duplication for a packet at backhaul adaptation protocol, BAP, layer; and means for communicating, based on the configuration information, the packet with a group of second network devices and the first central device in an integrated access and backhaul, IAB, network.

In some example embodiments, the configuration information indicates that a packet to be duplicated is identified by at least one of the following parameters: a BAP flow identification for a traffic flow comprising the packet; an ingress backhaul radio link control, RLC, channel; a backhaul RLC channel; a destination IP address; a source IP address; a packet priority; a flow label; a BAP routing identification; a non-UP traffic type; a tunnel IP address; a tunnel endpoint identification; or a BAP address for a second network device in the group, the second network device acting as a next hop of the first apparatus for transmitting the packet.

In some example embodiments, the configuration information indicates that a duplicated packet with a packet header comprising at least one of the following is to be merged: a BAP flow identification for a traffic flow comprising the duplicated packet, or a routing identification for the duplicated packet.

In some example embodiments, the means for communicating the packet comprises: means for receiving the packet; means for in accordance with a determination that the packet comprises at least one of parameters indicated by the configuration information, determining that the packet is to be duplicated into multiple traffic flows; means for generating the multiple traffic flows by adding a BAP sequence number to each duplicated packet; and means for transmitting the multiple traffic flows to multiple second network devices in the group acting as next hops of the first apparatus for communicating the packet.

In some example embodiments, the packet is to be duplicated into the multiple traffic flows associated with a routing identification, and a packet not to be duplicated is associated with a different routing identification.

In some example embodiments, the means for generating the multiple traffic flows comprises: means for in accordance with a determination that the packet to be duplicated into the multiple traffic flows, generating the multiple traffic flows with the BAP sequence number and a BAP flow identification for the multiple traffic flows.

In some example embodiments, the packet is received from a terminal device, and the first apparatus is a network node connected to the terminal device for accessing the IAB network.

In some example embodiments, the parameters indicated by the configuration information comprise at least one of the following: an egress backhaul radio link control, RLC, channel, a destination IP address, a source IP address, a packet priority, a routing identification, a non-UP traffic type, a tunnel IP address, or a tunnel endpoint identification.

In some example embodiments, the first apparatus is a first intermediate network node in the IAB network, the packet is received from a second network device in the group in a uplink direction, and the next hops of the first apparatus comprise one of a plurality of IAB donor distributed devices, a plurality of third intermediate IAB nodes, or a combination of both.

In some example embodiments, the first apparatus is a first intermediate network node, the packet is received from a second network device in the group in a downlink direction, the second network device is a IAB donor distributed device or a third intermediate network node, and the next hops of the first apparatus comprise a plurality of fourth intermediate network nodes.

In some example embodiments, wherein the parameters indicated by the configuration information comprises at least one of the following: a BAP flow identification for a traffic flow comprising the packet; an ingress backhaul radio link control, RLC, channel; an egress backhaul RLC channel; or a routing identification.

In some example embodiments, the first apparatus is a first IAB donor distributed device, the packet is received from the first central device in the downlink direction, and the next hops comprise a plurality of intermediate network nodes.

In some example embodiments, the parameters indicated by the configuration information comprise at least one of the following: an egress backhaul RLC channel; a destination IP address; a packet priority; a flow label; or a routing identification.

In some example embodiments, the first apparatus further comprises: means for tunneling, to a second donor distributed device, one of the multiple traffic flows.

In some example embodiments, the means for communicating the packet comprises: means for receiving a first packet from one of the second network devices; means for in accordance with a determination that a preconfigured condition associated with the first packet is met, determining that the first packet is a duplication of a previously received packet; and means for discarding the first packet.

In some example embodiments, the first apparatus is a first IAB donor distributed device, the second network device comprises one of a second IAB donor distributed device or an intermediate network node, and the next hop is the first central device, the preconfigured condition comprises the first packet being identified with at least one of parameters indicated by the configuration information, and wherein the parameter comprises at least one of the followings: a BAP sequence number, a BAP flow identification, a routing identification, or an ingress backhaul radio link control, RLC, channel.

In some example embodiments, the first apparatus is a first intermediate network node, and the next hop comprises one of a second intermediate node or an IAB donor distributed device, the preconfigured condition comprises the first packet being identified with at least one of parameters indicated by the configuration information, wherein the parameter comprises at least one of the followings: a BAP sequence number, a BAP flow identification, a routing identification, or an ingress backhaul radio link control, RLC, channel.

In some example embodiments, the first apparatus further comprises: means for receiving, from the first central device, a second message indicating removal of at least one additional parameter from the previously received packet, the additional parameter comprising at least one of the following: a BAP sequence number, or a BAP flow identification; and means for prior to transmitting the previously received packet to the next hop, removing the additional parameter from the previously received packet.

In some example embodiments, the first apparatus further comprises: means for communicating the packet with a terminal device in the IAB network.

In some example embodiments, the first central device is an IAB donor central unit, and the group of second network devices comprises at least one IAB donor distributed unit and a plurality of IAB network nodes.

In some example embodiments, a second apparatus capable of performing the method 800 (for example, the first IAB central device) may comprise means for performing the respective steps of the method 800. The means may be implemented in any suitable form. For example, the means may be implemented in a circuitry or software module. In some embodiments, the means may comprise at least one processor and at least one memory including computer program code. The at least one memory and computer program code are configured to, with the at least one processor, cause performance of the second apparatus.

In some example embodiments, the second apparatus comprises: means for generating a first message comprising configuration information about at least one of duplication and de-duplication for a packet at backhaul adaptation protocol, BAP, layer; means for transmitting, to a first network device controlled by the second apparatus, the first message; and means for communicating, based on the configuration information, the packet with the first network device and a group of second network devices in an integrated access and backhaul, IAB, network.

In some example embodiments, the configuration information indicates that the packet to be duplicated is identified by at least one of the following parameters: a BAP flow identification for a traffic flow comprising the packet; an ingress backhaul radio link control, RLC, channel; an egress backhaul RLC channel; a destination IP address; a source IP address; a packet priority; a flow label; a routing identification; a non-UP traffic type; a tunnel IP address; a tunnel endpoint identification; or a BAP address for a IAB network device as a next hop of the first IAB network device.

In some example embodiments, the first network device is an IAB donor distributed device, and the configuration information indicates that a packet to be duplicated in a downlink direction based on at least one of the following parameters: an egress backhaul RLC channel, a destination IP address, a packet priority, a flow label, or a routing identification.

In some example embodiments, the first network device is a network device connected to a terminal device for accessing the IAB network, and the configuration information indicates that the packet is to be duplicated in an uplink direction based on at least one of the following parameters: an egress backhaul RLC channel; a destination IP address; a source IP address; a packet priority; a routing identification; a non-UP traffic type; a tunnel IP address; a tunnel endpoint identification.

In some example embodiments, the first network device is an intermediate network device acting as a parent node connected to at least one child node in the group, and the configuration information indicates that the packet is to be duplicated in either an uplink direction or a downlink direction based on at least one of the following parameters: a BAP flow identification; an ingress backhaul RLC channel; an egress backhaul RLC channel; a routing identification.

In some example embodiments, the configuration information indicates that a duplicated packet with a packet header comprising at least one of the following is to be merged: a BAP flow identification, or a routing identification for the duplicated packet.

In some example embodiments, the second apparatus further comprises: means for transmitting, to the first network device, a second message indicating removal of at least one additional parameter from a packet header of a packet to be forwarded to a next hop of the first network device, the additional parameter comprising at least one of the following: a BAP sequence number of the packet, or a BAP flow identification for a traffic flow comprising the packet.

In some example embodiments, the first message is a routing configuration signaling message.

In some example embodiments, the second apparatus further comprises: means for transmitting, to a second central device controlling a second subset of the group of second network devices, a third message comprising BAP header fields to be used for duplication of the packet and tunnel information about an IAB donor distributed device in the second subset, the first subset being not overlapped with the second subset.

In some example embodiments, the second apparatus further comprises: means for communicating the packet with a terminal device in the IAB network.

In some example embodiments, the second apparatus is a IAB donor central unit, and the first network device and the second network devices comprise at least one IAB donor distributed unit and a plurality of IAB network nodes.

Figure 9:
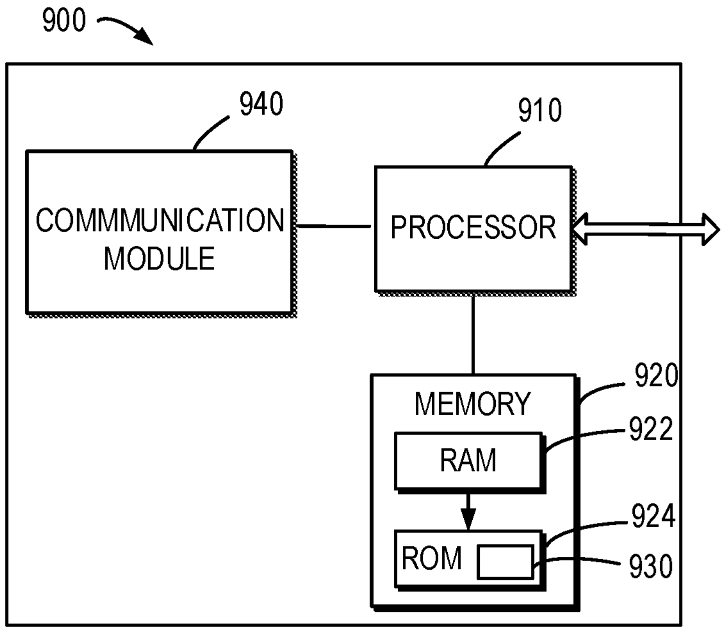
FIG. 9 shows a simplified block diagram of a device that is suitable for implementing example embodiments of the present disclosure.

FIG. 9 is a simplified block diagram of a device 900 that is suitable for implementing embodiments of the present disclosure. The device 900 may be provided to implement the communication device, for example the group of IAB network devices 122 to 129 and the first and second donor CUs 130 and 132 as shown in FIGS. 1, 5 and 6. As shown, the device 900 includes one or more processors 910, one or more memories 940 coupled to the processor 910, and one or more transmitters and/or receivers (TX/RX) 940 coupled to the processor 910.

The TX/RX 940 is for bidirectional communications. The TX/RX 940 has at least one antenna to facilitate communication. The communication interface may represent any interface that is necessary for communication with other network elements.

The processor 910 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 920 may include one or more non-volatile memories and one or more volatile memories. Examples of the non-volatile memories include, but are not limited to, a Read Only Memory (ROM) 924, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 922 and other volatile memories that will not last in the power-down duration.

A computer program 930 includes computer executable instructions that are executed by the associated processor 910. The program 930 may be stored in the ROM 920. The processor 910 may perform any suitable actions and processing by loading the program 930 into the RAM 920.

The embodiments of the present disclosure may be implemented by means of the program 930 so that the device 900 may perform any process of the disclosure as discussed with reference to FIGS. 7-8. The embodiments of the present disclosure may also be implemented by hardware or by a combination of software and hardware.

In some embodiments, the program 930 may be tangibly contained in a computer readable medium which may be included in the device 900 (such as in the memory 920) or other storage devices that are accessible by the device 900. The device 900 may load the program 930 from the computer readable medium to the RAM 922 for execution. The computer readable medium may include any types of tangible non-volatile storage, such as ROM, EPROM, a flash memory, a hard disk, CD, DVD, and the like.

Figure 10:
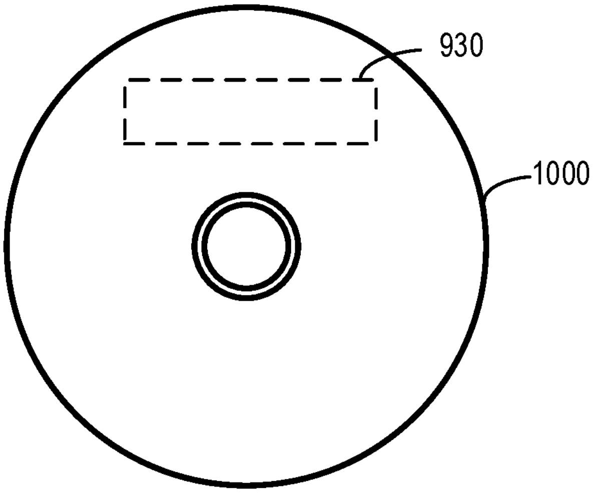
FIG. 10 shows a block diagram of an example computer readable medium in accordance with some embodiments of the present disclosure.

FIG. 10 shows an example of the computer readable medium 1000 in form of CD or DVD. The computer readable medium has the program 930 stored thereon.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, device, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the methods 700 or 800 as described above with reference to FIG. 7 or 8. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing device, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, device or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, device, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first network device, comprising:

at least one processor; and at least one memory including computer program codes;

the at least one memory and the computer program codes are configured to, with the at least one processor, cause the first network device at least to:

receive, from a first central device for controlling the first network device, a first message comprising configuration information about at least one of duplication and de-duplication for a packet at backhaul adaptation protocol, BAP, layer;

communicate, based on the configuration information, the packet with a group of second network devices and the first central device in an integrated access and backhaul, IAB, network;

receive, from the first central device, a second message indicating removal of at least one additional parameter from a previously received packet, the additional parameter comprising at least one of: a BAP sequence number of the previously received packet, or a BAP flow identification; and prior to transmitting the previously received packet to a next hop of the first network device, remove the additional parameter from the previously received packet.

2. The first network device of claim 1, wherein the at least one memory and the computer program codes are configured to, with the at least one processor, cause the first network device to communicate the packet by:

receiving the packet;

in accordance with a determination that the packet comprises at least one of parameters indicated by the configuration information, determining that the packet is to be duplicated into multiple traffic flows;

generating the multiple traffic flows by adding a BAP sequence number to each duplicated packet; and transmitting the multiple traffic flows to multiple second network devices in the group acting as next hops of the first network device for communicating the packet.

3. The first network device of claim 2, wherein the first network device is a first IAB donor distributed device, the packet is received from the first central device in a downlink direction, the next hops comprise a plurality of intermediate network nodes, and the at least one memory and the computer program codes are configured to, with the at least one processor, further cause the first network device to:

tunnel, to a second donor distributed device, one of the multiple traffic flows.

4. The first network device of claim 1, wherein the at least one memory and the computer program codes are configured to, with the at least one processor, cause the first network device to communicate the packet by:

receiving a first packet from one of the second network devices;

in accordance with a determination that a preconfigured condition associated with the first packet is met, determining that the first packet is a duplication of a previously received packet; and discarding the first packet.

5. A first central device comprising:

at least one processor; and at least one memory including computer program codes;

the at least one memory and the computer program codes are configured to, with the at least one processor, cause the first central device at least to:

generate a first message comprising configuration information about at least one of duplication and de-duplication for a packet at backhaul adaptation protocol, BAP, layer;

transmit, to a first network device controlled by the first central device, the first message;

communicate, based on the configuration information, the packet with the first network device and a group of second network devices in an integrated access and backhaul, IAB, network; and transmit, to a second central device controlling a second subset of the group of second network devices, a third message comprising BAP header fields to be used for duplication of the packet and tunnel information about an IAB donor distributed device in the second subset, wherein the first central device controls a first subset of the group of second network devices, and the first subset is not overlapped with the second subset.

6. A method performed by a first network device in an integrated access and backhaul, IAB, network, the method comprising:

receiving, from a first central device for controlling the first network device, a first message comprising configuration information about at least one of duplication and de-duplication for a packet at backhaul adaptation protocol, BAP, layer;

communicating, based on the configuration information, the packet with a group of second network devices and the first central device in the IAB network;

receiving, from the first central device, a second message indicating removal of at least one additional parameter from a previously received packet, the additional parameter comprising at least one of: a BAP sequence number of the previously received packet, or a BAP flow identification; and prior to transmitting the previously received packet to a next hop of the first network device, removing the additional parameter from the previously received packet.

7. The first network device of claim 4, wherein the preconfigured condition further comprises that no duplication for the first packet is to be performed at next one or more hops of the first network device.

8. The first network device of claim 2, wherein at least one of reserved bits in a header of a BAP protocol data unit is reserved to indicate a presence of the BAP sequence number and a BAP flow identification in the header, the reserved bits being indicative of a new BAP header type.

9. The first network device of claim 1, wherein the first network device merges two traffic flows by detecting and discarding duplicates of the packet if the two traffic flows have a same BAP flow identification or a same BAP routing identification without receiving additional configuration from the first central device for the merging.

10. The first network device of claim 7, wherein the parameter indicated by the configuration information for the preconfigured condition comprises at least one of: a BAP sequence number, or a BAP flow identification, and wherein the at least one memory and the computer program codes are configured to, with the at least one processor, further cause the first network device to transmit a single traffic flow to the next hop of the first network device after discarding the first packet, and wherein at least one of reserved bits in a header of a BAP protocol data unit indicates the presence of the BAP sequence number and the BAP flow identification as a new BAP header type.

11. The first network device of claim 3, wherein the first network device tunnels the one of the multiple traffic flows to the second donor distributed device based on at least one of: a BAP flow identification, an ingress backhaul RLC channel identification, a source IP address, or a BAP routing identification.

12. The first network device of claim 2, wherein the at least one memory and the computer program codes are configured to, with the at least one processor, cause the first network device to generate the multiple traffic flows by:

in accordance with a determination that the multiple traffic flows are multiplexed into a same backhaul RLC channel and use a same routing identification, adding a BAP flow identification to a header of each duplicated packet in the multiple traffic flows, in addition to the BAP sequence number.

13. The first network device of claim 2, wherein the at least one memory and the computer program codes are configured to, with the at least one processor, cause the first network device to determine how the packet is duplicated into the multiple traffic flows based on a BAP address for a next hop of the first network device and an identification of a backhaul RLC channel indicated by the configuration information, and wherein the first network device determines, from the BAP address for the next hop and the identification of the backhaul RLC channel, where the multiple traffic flows are to be sent.

14. The method of claim 6, further comprising:

receiving a first packet from one of the second network devices;

in accordance with a determination that a preconfigured condition associated with the first packet is met, wherein the preconfigured condition comprises that no duplication for the first packet is to be performed at next one or more hops of the first network device, determining that the first packet is a duplication of a previously received packet; and discarding the first packet.

15. The method of claim 6, further comprising:

generating multiple traffic flows by adding a BAP sequence number to each duplicated packet, wherein at least one of reserved bits in a header of a BAP protocol data unit is reserved to indicate a presence of the BAP sequence number and a BAP flow identification in the header, the reserved bits being indicative of a new BAP header type.

16. The method of claim 6, wherein the first message is a routing configuration signaling message, and wherein the removal of the additional parameter is configured by the first central device via F1AP signaling.

17. The method of claim 6, wherein the first message is transmitted via F1AP signaling, and wherein the configuration information indicates that:

when the first network device is a network device connected to a terminal device for accessing the IAB network, a packet to be duplicated in an uplink direction is identified based on at least one of: a differentiated services code point in combination with a destination IP address, a source IP address, or a combination thereof; and when the first network device is an IAB donor distributed device, a packet to be duplicated in a downlink direction is identified based on at least one of: a destination IP address, a packet priority, or a flow label.

18. The first central device of claim 5, wherein the first central device communicates with the second central device over an Xn interface, and the first subset of the group of second network devices comprises the first network device and at least one IAB donor distributed device controlled by the first central device.

19. The first central device of claim 5, wherein the at least one memory and the computer program codes are configured to, with the at least one processor, further cause the first central device to:

transmit, to the first network device, a second message indicating removal of at least one additional parameter from a packet header of a packet to be forwarded to a next hop of the first network device, the additional parameter comprising at least one of: a BAP sequence number of the packet, or a BAP flow identification for a traffic flow comprising the packet.

20. The first central device of claim 18, wherein the second central device configures the second subset of the group of second network devices with second configuration information about at least one of duplication and de-duplication for the packet at BAP layer, and wherein the second configuration information is different from the configuration information generated by the first central device.

* * * * *